US012730888B2

(12) United States Patent
Tsirkin

(10) Patent No.: US 12,730,888 B2
(45) Date of Patent: Sep. 8, 2026

(54) DENIAL OF SERVICE PROTECTION FOR CONFIDENTIAL COMPUTING

(71) Applicant: Red Hat, Inc., Raleigh, NC (US)

(72) Inventor: Michael Tsirkin, Ra'anana (IL)

(73) Assignee: Red Hat, LLC, Raleigh, NC (US)

( * ) Notice: Subject to any disclaimer, the term of this patent is extended or adjusted under 35 U.S.C. 154(b) by 58 days.

(21) Appl. No.: 18/887,726

(22) Filed: Sep. 17, 2024

(65) Prior Publication Data

US 2026/0087127 A1 Mar. 26, 2026

(51) Int. Cl.
*G06F 21/55* (2013.01)
*H04L 9/32* (2006.01)

(52) U.S. Cl.
CPC .......... *G06F 21/554* (2013.01); *H04L 9/3247* (2013.01); *G06F 2221/033* (2013.01)

(58) Field of Classification Search
CPC . G06F 21/554; G06F 2221/033; H04L 9/3247
See application file for complete search history.

(56) References Cited

U.S. PATENT DOCUMENTS 12,519,651 B1 * 1/2026 Farrell .................. H04L 9/3242
2008/0184227 A1 * 7/2008 Matsumoto ........... G06F 9/5077 718/1
2016/0103717 A1 * 4/2016 Dettori .................. G06F 9/5072 719/318
2016/0246629 A1 * 8/2016 Tsirkin ................ G06F 13/4027
2020/0151362 A1 * 5/2020 Harriman ................ G06F 21/64
2021/0294628 A1 * 9/2021 Tsirkin ................ G06F 9/45558
2022/0091998 A1 * 3/2022 Lal ........................ H04L 9/3278
2024/0126587 A1 * 4/2024 Minakshi ............ G06F 9/45558
2025/0238380 A1 * 7/2025 Caspi .................. G06F 12/1408
2025/0272385 A1 * 8/2025 Berrange ................ G06F 21/64
2025/0291703 A1 * 9/2025 Morse ................. G06F 11/3688
2025/0310077 A1 * 10/2025 Dinu ..................... H04L 9/3257
2025/0328375 A1 * 10/2025 Walsh ................. G06F 9/45558
2025/0335608 A1 * 10/2025 Pulikode Mukundan .................. G06F 21/64
2025/0335638 A1 * 10/2025 Fowler .................. G06F 21/565
2025/0342254 A1 * 11/2025 Jacquin ................... G06F 21/57
2025/0355993 A1 * 11/2025 Krishnamurthy ....... G06F 21/53
2025/0390402 A1 * 12/2025 Edwards ............. G06F 11/2247
2026/0005839 A1 * 1/2026 Thomas .................. G06F 21/85

* cited by examiner

*Primary Examiner* — Stephen T Gundry
(74) *Attorney, Agent, or Firm* — Dority & Manning, P.A.

(57) ABSTRACT

An execution measurement event associated with a Virtual Machine (VM) managed by a hypervisor is detected, wherein the VM is implemented using a first processor device of one or more processor devices. Responsive to detecting the execution measurement event, execution measurement information descriptive of a period of execution for the VM prior to detection of the execution measurement event is measured using the first processor device of the one or more processor devices. A cryptographic signature is generated for the execution measurement information, wherein the cryptographic signature verifies that the execution measurement information was measured using the first processor device.

20 Claims, 5 Drawing Sheets

DENIAL OF SERVICE PROTECTION FOR CONFIDENTIAL COMPUTING

BACKGROUND

Virtualization is the creation of multiple simulated computing environments, such as virtual machines (VMs) or containers, on a physical hardware system. Generally, virtualization is achieved through a layer of software known as a hypervisor, which abstracts and allocates the underlying hardware resources such as CPU, memory, and storage, allowing multiple operating systems and applications to run independently on the same physical host. Virtualization enhances hardware utilization, improves scalability, and provides isolation between VMs, ensuring that the performance or security of one VM is not affected by others. This technology underpins modern cloud computing and enterprise data centers by enabling efficient resource management, flexibility, and cost savings through shared infrastructure.

Confidential computing is a popular approach to protecting data when using virtualization technologies. In the context of virtualization, confidential computing refers to techniques that ensure the protection of sensitive data and code during processing, even in untrusted or multi-tenant cloud environments. Confidential computing enclaves leverage hardware-based Trusted Execution Environments (TEEs) and secure virtualization technologies, such as memory encryption, secure enclaves, and remote attestation, to isolate critical computations and prevent unauthorized access to data while in use. These methods address security challenges posed by shared infrastructures, where hypervisors, system administrators, or even malicious co-tenants could potentially compromise the confidentiality and integrity of data processed within virtual machines (VMs).

SUMMARY

An execution measurement event associated with a Virtual Machine (VM) managed by a hypervisor is detected. When detected, execution measurement information descriptive of a period of execution for the VM prior to detection of the execution measurement event can be measured using the same processor device on which the VM executes. A cryptographic signature is generated for the execution measurement information. The cryptographic signature can verify that the execution measurement information was measured using the same processor device on which the VM executes.

In one implementation, a method is provided. The method includes detecting an execution measurement event associated with a Virtual Machine (VM) managed by a hypervisor, wherein the VM is implemented using a first processor device of the one or more processor devices. The method further includes, responsive to detecting the execution measurement event, measuring, by the computing system using the first processor device of the one or more processor devices, execution measurement information descriptive of a period of execution for the VM prior to detection of the execution measurement event. The method further includes generating a cryptographic signature for the execution measurement information, wherein the cryptographic signature verifies that the execution measurement information was measured using the first processor device.

In another implementation, a computing system is provided. The computing device includes a memory, and one or more processor devices coupled to the memory. The processor device(s) are to detect an execution measurement event associated with a VM managed by a hypervisor, wherein the VM is implemented using a first processor device of the one or more processor devices. The processor device(s) are further to, responsive to detecting the execution measurement event, measure, using the first processor device of the one or more processor devices, execution measurement information descriptive of a period of execution for the VM prior to detection of the execution measurement event. The processor device(s) are further to generate a cryptographic signature for the execution measurement information, wherein the cryptographic signature verifies that the execution measurement information was measured using the first processor device.

In another implementation, a non-transitory computer-readable storage medium is provided. The non-transitory computer-readable storage medium includes executable instructions to cause one or more processor device(s) to detect an execution measurement event associated with a Virtual Machine (VM) managed by a hypervisor, wherein the VM is implemented using a first processor device of the one or more processor devices. The instructions further cause the processor device(s) to, responsive to detecting the execution measurement event, measure, using the first processor device of the one or more processor devices, execution measurement information descriptive of a period of execution for the VM prior to detection of the execution measurement event. The instructions further cause the processor device(s) to generate a cryptographic signature for the execution measurement information, wherein the cryptographic signature verifies that the execution measurement information was measured using the first processor device.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
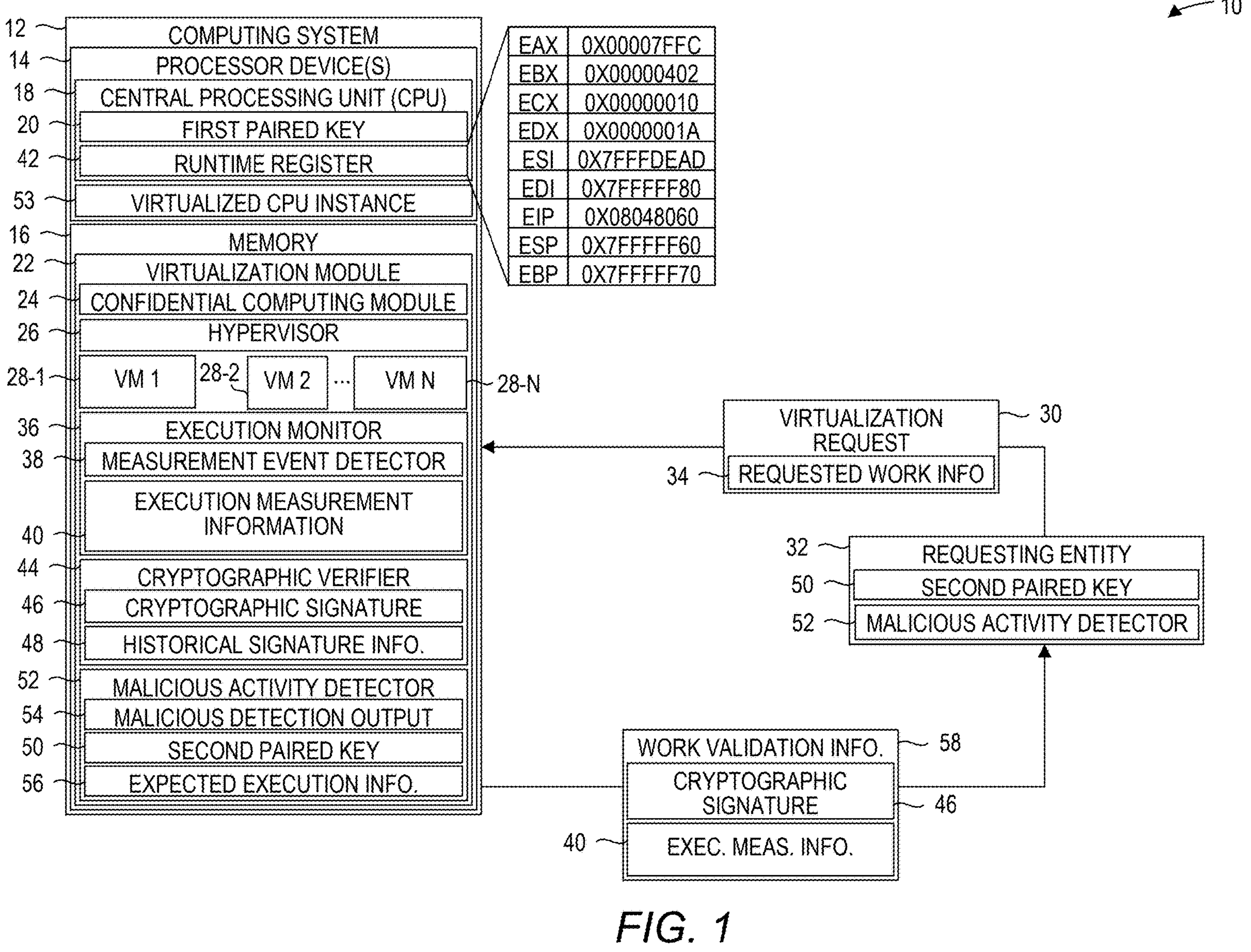
FIG. 1 is a block diagram of a computing environment suitable for protecting against denial of service attacks in virtualized confidential computing environments according to some implementations of the present disclosure.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples and claims are not limited to any particular sequence or order of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

Virtualization refers to the creation of multiple simulated computing environments, such as virtual machines (VMs) or containers, on a physical hardware system. Generally, virtualization is achieved through a layer of software known as a hypervisor, which abstracts and allocates the underlying hardware resources such as CPU, memory, and storage, allowing multiple operating systems and applications to run independently on the same physical host. Virtualization enhances hardware utilization, improves scalability, and provides isolation between VMs, ensuring that the performance or security of one VM is not affected by others. This technology underpins modern cloud computing and enterprise data centers by enabling efficient resource management, flexibility, and cost savings through shared infrastructure Confidential computing is a popular approach to protecting data when using virtualization technologies. In the context of virtualization, confidential computing refers to techniques that ensure the protection of sensitive data and code during processing, even in untrusted or multi-tenant cloud environments. Confidential computing enclaves leverage hardware-based Trusted Execution Environments (TEEs) and secure virtualization technologies, such as memory encryption, secure enclaves, and remote attestation, to isolate critical computations and prevent unauthorized access to data while in use. These methods address security challenges posed by shared infrastructures, where hypervisors, system administrators, or even malicious co-tenants could potentially compromise the confidentiality and integrity of data processed within virtual machines (VMs).

Confidential computing promises data confidentiality for users with sensitive information, and requires specific security measures to fulfill such promises. Current approaches to confidential computing leverage a variety of security technologies to protect against malicious attacks, such as remote code execution, or inadvertent exposure of sensitive information by the hypervisor. For example, Intel® Software Guard Extensions (SGX) provide isolation, encryption, and attestation capabilities to protect data that is in-use.

Attacks belonging to the category of "denial of service" attacks are particularly difficult to defend against in the context of virtualized confidential computing environments. As described herein, a "denial of service" attack refers to some attempt (e.g., by a malicious actor) to disrupt or exhaust the computational resources of a virtualized environment and/or confidential computing enclave. There are many types of denial of service attacks that can be leveraged by malicious actors, such as VM targeting (e.g., disrupting the computing resources used to execute a specific VM), hypervisor targeting (e.g., overwhelming the hypervisor with malicious workloads, etc.), container-based targeting (e.g., overwhelming the computing resources being used to execute a container), etc. In some instances, denial of service attacks will attack specific security infrastructure, such as a trusted execution environment.

In the context of confidential computing, denial of service attacks against the hypervisor have proven to be a type of denial of service attack that is particularly difficult to mitigate. This is because enforcing data confidentiality on an executing VM generally requires at least some processing operations performed on the VM to remain confidential even to the hypervisor. However, in turn, this means that actions taken by the hypervisor cannot be easily verified. As such, a hypervisor that has been compromised to perform malicious actions against a particular VM cannot be accurately detected using conventional approaches.

For example, assume that a hypervisor manages a VM for a first requesting entity (e.g., a business organization, a technology company, etc.) in a confidential computing enclave. A high-throughput virtual or physical CPU (e.g., with high associated costs) can be assigned to one of the VMs. The hypervisor can perform a VM exit to interrupt virtual CPU execution of the high-throughput CPU to execute another unrelated virtual CPU requested by a second requesting entity. This sequence of operations is common in virtualized environments. However, if the hypervisor is compromised by a malicious actor, the hypervisor may take costs associated with execution of the unrelated virtual CPU and instead maliciously label them as costs associated with execution of the high-throughput CPU, thus increasing costs for the first requesting entity. Further, due to data protection policies enforced within most confidential computing enclaves, it is prohibitively difficult, or impossible, for the first requesting entity to verify whether the costs labeled by the hypervisor are legitimate or malicious.

Accordingly, implementations described herein propose denial of service protection for confidential computing. More specifically, a computing system in a confidential computing environment can detect an execution measurement event (e.g., a computing system that implements a hypervisor, a computing system within the same confidential computing environment as another device or system implementing the hypervisor etc.). The execution measurement event can be associated with a VM managed by a hypervisor. The VM can be implemented using a processor device of the computing system.

As described herein, an "execution measurement event" can refer to any type or manner of event driven by a virtualized entity (e.g., a VM, a container, etc.) and a virtualization managing entity (e.g., a hypervisor). For example, assume a VM exit event (e.g., when execution on the VM exits and returns to the hypervisor) occurs for a VM managed by a hypervisor and implemented using a CPU of the computing system (e.g., a physical CPU, a virtual CPU, etc.). The computing system can detect occurrence of the VM exit event.

Upon detection of the execution measurement event, the computing system can measure execution measurement information. Specifically, the computing system can measure the execution measurement information using the first processor device that is also being used to implement the VM. In a confidential computing environment, processor execution is protected by a number of security processes that make it prohibitively difficult for malicious actors to gain access to the processor device. As such, by measuring the execution measurement information with the same processor device that implements the VM, the computing system can maintain a confidential computing environment while ensuring that the execution measurement information is accurate and valid (i.e., not modified by malicious actors).

The execution measurement information can describe a period of execution for the VM prior to the detection of the execution measurement event. In some implementations, the execution measurement information can include (or can be derived from) state information from the CPU itself, such as a CPU runtime register. In this manner, the execution measurement information can provide an indication as to the operations performed by the CPU prior to detection of the execution measurement event.

The computing system can generate a cryptographic signature for the execution measurement information. The cryptographic signature verifies that the execution measurement information was measured using the first processor device. In some implementations, the cryptographic signature can be generated using the same processor device as was used to generate the execution measurement information. For example, assume the processor device that implements the VM has a secret key embedded in the firmware or hardware of the processor device. The processor device can utilize the secret key to generate the cryptographic signature for the execution measurement information, or to otherwise encrypt the execution measurement information. Another key can be utilized to verify the signature or otherwise decrypt the execution measurement information. In such fashion, implementations described herein enable validation and verification of work performed by a processor device, thus mitigating a major attack vector that currently exists in the context of virtualization in confidential computing environments.

Aspects of the present disclosure provide a number of technical effects and benefits. As one example, implementations described herein can be leveraged to mitigate, or eliminate, major attack vectors that are currently exploited by malicious actors to degrade the performance of virtualized confidential computing environments. In turn, by mitigating these attack vectors, implementations described herein obviate the substantial computational costs and other costs associated with remediation of successful attacks by malicious actors (e.g., memory, computing resources, power, etc.).

FIG. 1 is a block diagram of a confidential computing environment 10 suitable for protecting against denial of service attacks in virtualized confidential computing environments according to some implementations of the present disclosure. A confidential computing environment 10 can include a computing system 12 with one or more processor device(s) 14 and a memory 16. As described herein, the "confidential computing environment" 10 can be any type or manner of computing environment (e.g., a collection of computing devices, systems, and related infrastructure associated with a particular entity or organization) in which sensitive data and code is protected during processing, even in untrusted or multi-tenant cloud scenarios. For example, the confidential computing environment 10 can be or otherwise include a confidential computing "enclave" that leverages hardware-based TEEs and secure virtualization technologies, such as memory encryption, to isolate critical computations and prevent unauthorized access to data while in use.

In some implementations, the computing system 12 may be a computing system that includes multiple computing devices. Alternatively, in some implementations, the computing system 12 may be one or more computing devices within a computing system that includes multiple computing devices. Similarly, the processor device(s) 14 may include any computing or electronic device capable of executing software instructions to implement the functionality described herein.

The memory 16 can be or otherwise include any device(s) capable of storing data, including, but not limited to, volatile memory (random access memory, etc.), non-volatile memory, storage device(s) (e.g., hard drive(s), solid state drive(s), etc.). In some implementations, the memory 16 can include a containerized unit of software instructions (i.e., a "packaged container"). The containerized unit of software instructions can collectively form a container that has been packaged using any type or manner of containerization technique.

A containerized unit of software instructions can include one or more applications, and can further implement any software or hardware necessary for execution of the containerized unit of software instructions within any type or manner of computing environment. For example, the containerized unit of software instructions can include software instructions that contain or otherwise implement all components necessary for process isolation in any environment (e.g., the application, dependencies, configuration files, libraries, relevant binaries, etc.).

In some implementations, the confidential computing environment 10 can include multiple types of nodes. As described herein, a "node" generally refers to a discrete unit of hardware and/or software resources. In some instances, nodes within the confidential computing environment 10 can be configured to perform specific tasks. For example, some nodes within the confidential computing environment 10 can be configured as "compute" or "processing" nodes that handle processing tasks or provide processing-heavy services. Compute nodes are generally allocated with hardware devices that can facilitate processing tasks, such as Graphics Processing Units (GPUs), Central Processing Units (CPUs), Application-specific Integrated Circuits (ASICs), Field-Programmable Gate Arrays (FPGAs), etc.

Conversely, storage nodes can be allocated with hardware devices to facilitate storage tasks, such as storage devices (e.g., hard drives, etc.), memory, high-bandwidth network devices, physical storage media, etc.). It should be noted that in some instances, storage nodes can include processing devices (e.g., CPUs, etc.) to facilitate storage operations (e.g., read/write operations) and processing nodes can include storage devices (e.g., random access memory) to facilitate processing operations.

In some implementations, the confidential computing environment 10 can be, or otherwise include, a software development environment. The confidential computing environment 10 can include computing device(s), system(s), etc. that are utilized for developing software. For example, the computing system 12 can be a system for creating (i.e., developing) and/or maintaining a large software project (e.g., an application. To do so, the computing system 12 may maintain a codebase for the large software project, a code versioning system and/or versioning information for the codebase, etc.

In particular, the processor device(s) 14 of the computing system 12 can include a CPU 18. It should be noted that the CPU 18 can be any type or manner of processor device or device(s), and is only illustrated as a single CPU herein to more clearly illustrate various implementations of the present disclosure. For example, in some instances the CPU 18 can be or include a GPU, a System-on-Chip (SoC), an ASIC, etc. In some implementations, the CPU 18 can be a virtualized CPU. Alternatively, in some implementations, the CPU 18 can be a physical CPU.

In some implementations, the CPU 18 can be a CPU designed or otherwise configured for use in a confidential computing environment, such as the confidential computing environment. To do so, the CPU can include a first paired key 20. The first paired key 20 is also referred to as a "key value" interchangeably as described herein. The first paired key 20 can be a secret key or other element of information that is paired to another corresponding key or element. In some implementations, the first paired key 20 can be embedded in the firmware of the CPU 18. The computing system 12 can access the first paired key 20. For example, if the CPU 18 is a physical CPU, the first paired key 20 can be embedded in the firmware when the CPU 18 is manufactured or subsequently via a firmware update. For another example, if the CPU 18 is a virtual CPU, the first paired key 20 can be embedded in the firmware when the virtual CPU 18 is instantiated or subsequently via an update to the virtual firmware of the CPU 18.

The memory 16 of the computing system 12 can include a virtualization module 22. The virtualization module 22 can facilitate various operations to implement a virtualization service for other entities, such as a requesting entity 32. In particular, the virtualization module 22 can include a confidential computing module 24. The confidential computing module 24 can implement a virtual machines in a manner that is compliant with parameters, policies, etc. mandated by the confidential computing environment 10.

The virtualization module 22 can include a hypervisor 26. The hypervisor 26 can be a program, module, etc. that manages virtualization and virtualized entities, such as virtual machines. For example, the virtualization module 22 can be a module that implements Red Hat® OpenShift® virtualization technologies or the like.

The hypervisor 26 can manage VMs 28-1-28-N (generally, VMs 28). The VMs 28 can be implemented using various processor device(s) accessible to the computing system 12 (and the hypervisor 26). In particular, the virtualization module 22 can run (instantiate, execute, etc.) at least the VM 28-1 using the CPU 18.

In some implementations, the CPU 18 can be a virtual CPU, and the virtualization module 22 can run the VM 28-1 using the virtual CPU. The CPU 18 can enable the VM 28-1 to execute instructions as if it were running on physical hardware while sharing underlying resources with other VMs (e.g., VM 28-2) on the same host. The hypervisor 26 can manage utilization of physical resources (e.g., the CPU 18, the processor device(s) 14, etc.) by scheduling vCPUs to run on physical CPU cores. When active, the CPU 18 can execute the machine instructions of the VM 28-1 directly on the physical CPU, while the hypervisor 26 handles privileged operations, memory virtualization, and device access.

The VMs 28 can be instantiated, run, executed, etc. using the processor device(s) 14 of the computing system 12. Some (or all) of the VMs 28 can be instantiated and run by the virtualization module 22 in response to a virtualization request 30. The virtualization request 30 can be received from a requesting entity 32 (e.g., a computing device or system associated with an individual, organization, etc.), and can specify a particular workload and/or configuration for a virtual machine. More specifically, the virtualization request 30 can include requested work information 34. In some implementations, the requested work information 34 can indicate a type of workload to be fulfilled by the virtualization module 22. The requested work information 34 may include a container image, a virtual machine configuration, a requested task or output, a script, etc.

For example, the requesting entity 32 can provide the virtualization request 30 to the virtualization module 22. The virtualization request 30 can include the requested work information 34, which can include a configuration for a virtual machine instance (and, in some instances, a corresponding workload to be performed with the configured virtual machine instance). In response, the virtualization module 22 can instantiate the VM 26-1.

The virtualization module 22 can include an execution monitor 36. The execution monitor 36 can monitor execution of the VMs 28 with the processor device(s) 14 of the computing system 12. The execution monitor 36 can include a measurement event detector 38. The measurement event detector 38 can detect occurrence of an execution measurement event. An execution measurement event can refer to any type or manner of measurable or detectable event that occurs at the VMs 28, the hypervisor 26, the CPU 18, the processor device(s) 14, etc. Examples of execution measurement events can include VM exits, input/output (IO) handling events or requests, page faults, CPUID instructions, interrupt handling, power management events, etc.

The measurement event detector 38 can detect the occurrence of an execution measurement event associated with one of the VMs 28 managed by the hypervisor 26. For example, the measurement event detector 38 can detect the occurrence of a VM exit event associated with the VM 28-1. In response, the execution monitor 36 can measure (i.e., generate, compute, retrieve, etc.) execution measurement information 40 using the same device of the processor device(s) 14 that executes the VM of the VMs 28 in question. For example, if the VM 28-1 executes on the CPU 18, and the measurement event detector 38 detects an execution measurement event at the VM 28-1, the execution monitor 36 can measure the execution measurement information 40 using the CPU 18.

Additionally, or alternatively, in some implementations, the execution measurement event can occur after a predetermined amount of time has passed since the last occurrence of a previous execution measurement event. In this manner, the virtualization module 22 can ensure regular validation of the hypervisor 26 and the VMs controlled by the virtualization module 22.

The execution measurement information 40 can describe a period of execution for the VM 28-1 prior to detection of the execution measurement event. To do so, the execution measurement information 40 can describe operations performed by the CPU 18, data processed by the CPU 18, etc. For example, the execution measurement information 40 can include information retrieved directly from the CPU 18 (e.g., register data). For another example, the execution measurement information 40 can include logging information for prior operations performed by the CPU 18.

In some implementations, the execution measurement information 40 can include information retrieved from the CPU 18 upon which the VM 28-1 executes, such as information from a bus or register. For example, the CPU 18 can include a runtime register 42. Upon detecting the execution measurement event with the measurement event detector 38, the execution monitor 36 can retrieve the most recent information from the runtime register 42. The information from the runtime register 42 can be included in the execution measurement information.

The virtualization module 22 can include a cryptographic verifier 44. The cryptographic verifier 44 can generate a cryptographic signature 46 that verifies the authenticity of the execution measurement information 40. More specifically, the cryptographic signature 46 can verify that the execution measurement information was measured using the first processor device. In some implementations, the cryptographic verifier 44 can utilize the specific device of the processor device(s) 14 upon which the VM 28 in question executes. For example, if the execution measurement information 40 is measured for the VM 28-1, and the VM 28-1 executes on the CPU 18, the cryptographic verifier 44 can generate the cryptographic signature 46 using the CPU 18. In this manner, the cryptographic signature 46 can validate the execution measurement information as being authentically collected with the CPU 18.

In some implementations, the cryptographic signature 46 can be generated based on historical signature information 48. For example, the historical signature information 48 can be or otherwise include a previous cryptographic signature generated prior to the cryptographic signature 46. The cryptographic signature 46 can be generated based on the execution measurement information 40 (e.g., the runtime register 42) and/or the historical signature information 48 (e.g., the prior cryptographic signature).

The cryptographic signature 46 can be generated using any type of conventional cryptographic techniques. In some implementations, the cryptographic signature 46 can be generated based on the first paired key 20 (e.g., encrypted using the first paired key 20, etc.). More specifically, the first paired key 20 can be paired to a second paired key 50. The second paired key 50 can be provided to the entity that requested the VM 28 at which the execution measurement event was detected. For example, the virtualization module 22 can generate the first paired key 20 and the second paired key 50. The virtualization module 22 can embed the first paired key in the CPU 18 upon instantiation, and then provide the second paired key 50 to the requesting entity 32.

In some implementations, the first paired key 20 can be generated dynamically as the CPU 18 is instantiated. In some implementations, the first paired key 20 can be updated subsequent to instantiation of the CPU 18 (e.g., via an update to the virtual firmware of the CPU 18. In some implementations, if the CPU 18 is a physical CPU, the first paired key 20 can be embedded in the CPU 18 during the manufacturing process or subsequently via a firmware update.

Alternatively, the requesting entity 32 can provide the first paired key 20 to the computing system 12. For example, if the execution measurement event was detected at the VM 28-1, the requesting entity 32 that requested the VM 28-1 can include the first paired key in the VM configuration included in the requested work information 34. If the requested work information 34 requests a virtualized CPU (vCPU) (e.g., the CPU 18) be instantiated to execute the VM 28-1, the virtualization module 22 can instantiate the CPU 18 as a vCPU that includes the first paired key 20. Additionally, the virtualization module 22 can instantiate the CPU 18 in a manner that complies with the confidential computing environment 10, such that the first paired key 20 is not known (or exposed) to the hypervisor 26.

In some implementations, the first paired key 20 can be used to generate the cryptographic signature 46 via a symmetric key cryptography technique (e.g., Hash-based Message Authentication Code, etc.) or an asymmetric key cryptography technique. For example, assume that the second paired key 50 is provided to the requesting entity 32. The virtualization module 22 can provide the execution measurement information 40 and the cryptographic signature 46 to the requesting entity 32. The requesting entity 32 can verify the cryptographic signature 46 using the second paired key 50.

In some implementations, the virtualization module 22 can include a malicious activity detector 52. The malicious activity detector 52 can analyze the execution measurement information 40 to determine whether the execution measurement event is associated with malicious activity, and/or whether the period of execution described by the execution measurement information includes malicious activity. To do so, the malicious activity detector 52 can generate a malicious detection output 54. The malicious detection output 54 can be indicative of whether the period of execution for the VM 28-1 prior to detection of the execution measurement event is malicious.

For example, assume the VM 28-1 is executed on the CPU 18, and the measurement event detector 38 detects an VM exit event at the VM 28-1. The execution monitor can generate the execution measurement information 40, and the malicious activity detector 52 can process the execution measurement information 40 to determine whether malicious activity is detected within the execution measurement information. If the execution measurement information indicates activity that is unexpected, the malicious detection output 54 identifies the malicious activity as an unauthorized VM exit event caused by the hypervisor 26.

In some implementations, the malicious activity detector 52 can compute the malicious detection output 54 (e.g., using machine learning techniques, cybersecurity techniques, etc.). For example, the malicious activity detector 52 can process the execution measurement information 40 with a machine-learned model trained to identify malicious activity.

In some implementations, the execution measurement information 40, when sent to a requesting entity (e.g., the requesting entity 32) can include transactional information related to virtualization actions performed for the requesting entity 32. For example, if the virtualization module 22 is utilized to provide virtualization services with certain associated costs, the execution measurement information 40 can describe costs incurred in response to the virtualization request 30. This information can also be processed with the malicious activity detector 52 to detect malicious activity.

For example, assume the VM exit event occurs and the hypervisor 26 interrupts execution of the VM 28-1 on the CPU 18. The virtualization module 22 instantiates a new virtualized CPU instance 53 (referred to interchangeably as a virtualized processor device as described herein) and begins to perform operations using the new virtualized CPU instance 53. However, the execution measurement information 40 may indicate that additional costs have been incurred at the CPU 18 despite the occurrence of the VM exit event. For example, the execution measurement information 40 may describe additional operations performed by the CPU 18 subsequent to the VM exit event (or costs associated with such operations). The malicious activity detector 52 can infer that the hypervisor 26 has been compromised to maliciously charge the requesting entity 32 costs for unrelated operations.

In some implementations, the malicious activity detector 52 can include the second paired key 50. Additionally, or alternatively, in some implementations, the requesting entity 32 can include the malicious activity detector 52 as described with regards to the computing system 12. In such fashion, the requesting entity 32 can validate the cryptographic signature 46 based on the second paired key 50, and once validated, analyze the execution measurement information 40 with the malicious activity detector 52.

In some implementations, the malicious activity detector 52 can include expected execution information 56. The expected execution information 56 can describe a "correct" or expected period of execution (and/or associated costs) based on the virtualization request 30 received from the requesting entity 32. The malicious activity detector 52 can compare the expected execution information 56 to the execution measurement information 40 to generate the malicious detection output 54. For example, assume that the expected execution information 56 indicates an expected duration of execution based on the requested work information 34. If the execution measurement information 40 indicates a duration of execution that does not match the expected duration of execution, the malicious detection output 54 can indicate that malicious activity is detected.

In some implementations, the malicious activity detector 52 can generate and provide work validation information 58 to the requesting entity 32. The work validation information 58 can be used by the requesting entity 32 to determine whether the work performed in response to the virtualization request 30 is valid. In some implementations, the work validation information 58 can include the cryptographic signature 46. Additionally, or alternatively, in some implementations, the work validation information 58 can include the execution measurement information 40. The malicious detection output 54 can identify the malicious activity as an unauthorized VM exit event caused by the hypervisor 26. In some implementations, the computing system 12 can generate a notification indicating that the hypervisor 26 is compromised or is associated with malicious activity.

Figure 2:
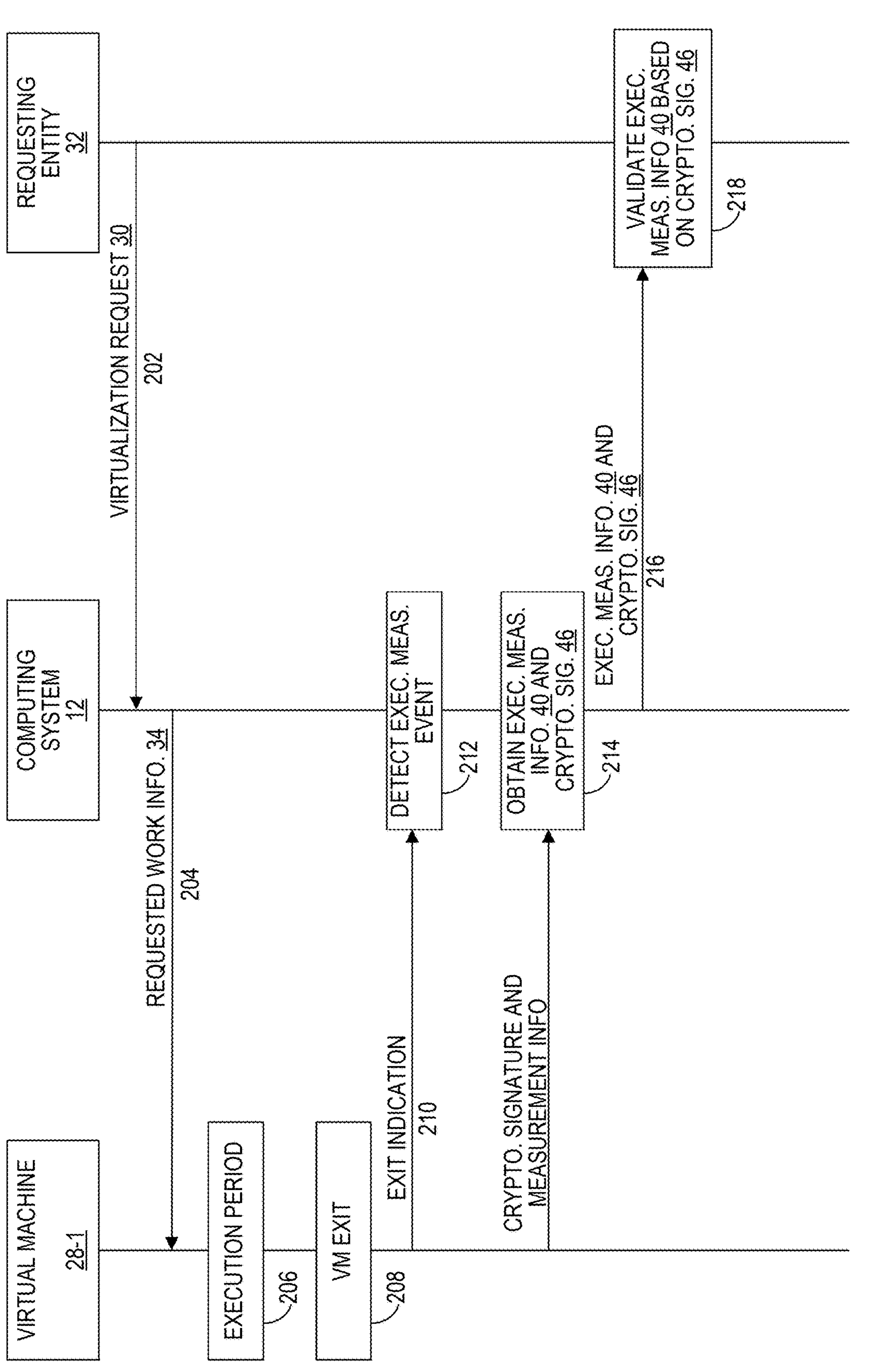
FIG. 2 is a communication flow diagram for protecting against denial of service attacks in virtualized confidential computing environments according to some implementations of the present disclosure.

FIG. 2 is a communication flow diagram for protecting against denial of service attacks in virtualized confidential computing environments according to some implementations of the present disclosure. FIG. 2 will be discussed in conjunction with FIG. 1. In particular, at 202, the requesting entity 32 can send the virtualization request 30 to the computing system 12. In response, at 204, the computing system 12 can provide the requested work information 34 to the VM 28-1. In some implementations, the computing system 12 can instantiate the VM 28-1 based on the requested work information 34. Alternatively, in some implementations, the computing system 12 can cause some other computing device to instantiate the VM 28-1 based on the requested work information 34. It should be noted that, although the VM 28-1 is shown separately from the computing system 12, the VM 28-1 can be instantiated and executed using various processor device(s) (physical and/or virtual) of the computing system 12.

At 206, the VM 28-1 can execute for the duration of an execution period. At 208, a VM exit event can occur, stopping the execution period and returning control to a hypervisor that manages the VM 28-1.

At 210, some indication of the VM exit event 208 can be received by the computing system 12. For example, the hypervisor 26 that manages the VM 28-1 can send an indication to the computing system 12. For another example, the computing system 12 can actively monitor the VM 28-1 and/or the hypervisor 26 to detect changes in behavior or state, the occurrence of events, etc.

At 212, the computing system 12 can detect the execution measurement event. At 214, the computing system 12 can obtain the execution measurement information 40 and the cryptographic signature 46. In some implementations, the computing system 12 can obtain the execution measurement information 40 and the cryptographic signature 46 from the VM 28-1. Additionally, or alternatively, in some implementations, the computing system 12 can generate the execution measurement information 40 and/or the cryptographic signature 46.

At 216, the computing system 12 can provide the execution measurement information 40 and the cryptographic signature 46 to the requesting entity 32. At 218, the requesting entity can validate the execution measurement information 40 based on the cryptographic signature 46.

Figure 3:
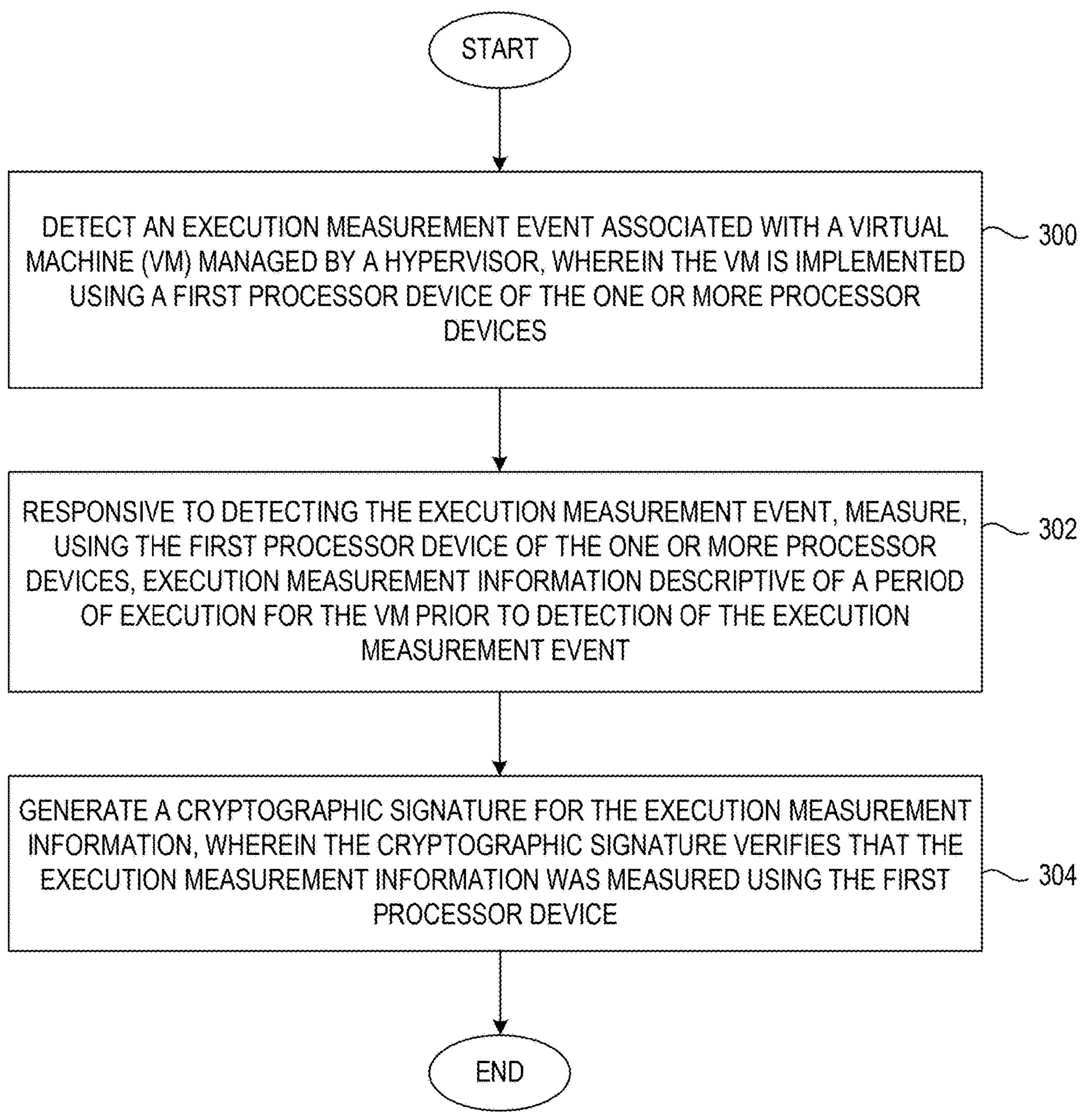
FIG. 3 is a flowchart illustrating operations performed by the computing system of FIG. 1 for protecting against denial of service attacks in virtualized confidential computing environments, according to one example.

FIG. 3 is a flowchart illustrating operations performed by the computing system of FIG. 1 for protecting against denial of service attacks in virtualized confidential computing environments, according to one example. Elements of FIG. 1 are referenced in describing FIG. 3 for the sake of clarity. In FIG. 3, operations begin with a processor device of a computing device, computing system, network node, etc., such as the processor device(s) 14 of the computing system 12 of FIG. 1, and for some (or all) of the operations, the CPU 18. The processor device(s) 14 are to detect an execution measurement event associated with a VM 28-1 managed by a hypervisor 26, wherein the VM 28-1 is implemented using a first processor device (CPU 18) of the processor device(s) 14 (block 300). The CPU 18 is to measure execution measurement information 40 descriptive of a period of execution for the VM 28-1 prior to detection of the execution measurement event (block 302). The processor device (s) 14 are further to generate a cryptographic signature 46 for the execution measurement information 40, wherein the cryptographic signature 46 verifies that the execution measurement information 40 was measured using the CPU 18 (block 304).

Figure 4:
FIG. 4 is a block diagram of the computing device of FIG. 1 for protecting against denial of service attacks in virtualized confidential computing environments, according to one example.
Figure 4:
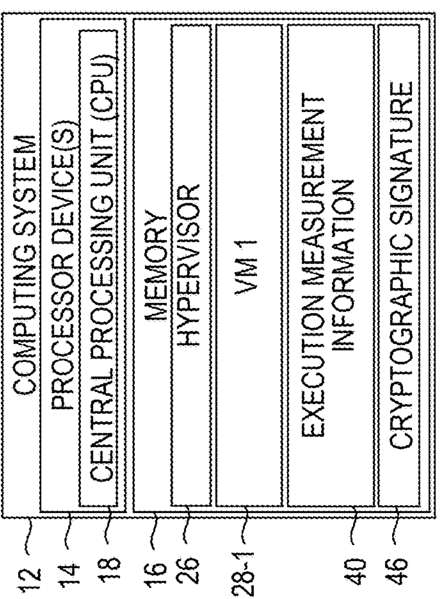

FIG. 4 is a block diagram of the computing device of FIG. 1 for protecting against denial of service attacks in virtualized confidential computing environments, according to one example. Elements of FIG. 1 are referenced in describing FIG. 4 for the sake of clarity. In the example of FIG. 4, the computing system 12 includes a memory 16 and processor device(s) 14 coupled to the memory 16. The processor device(s) 14 include a CPU 18. The processor device(s) 14 are to detect an execution measurement event associated with a VM 28-1 managed by a hypervisor 26, wherein the VM 28-1 is implemented using a CPU 18 of the processor device(s) 14. The processor device(s) 14 are further to, responsive to detecting the execution measurement event and using the CPU 18, measure execution measurement information 40 descriptive of a period of execution for the VM 28-1 prior to detection of the execution measurement event. The processor device(s) 14 are further to a generate cryptographic signature 46 for the execution measurement information 40, wherein the cryptographic signature 46 verifies that the execution measurement information 40 was measured using the CPU 18.

Figure 5:
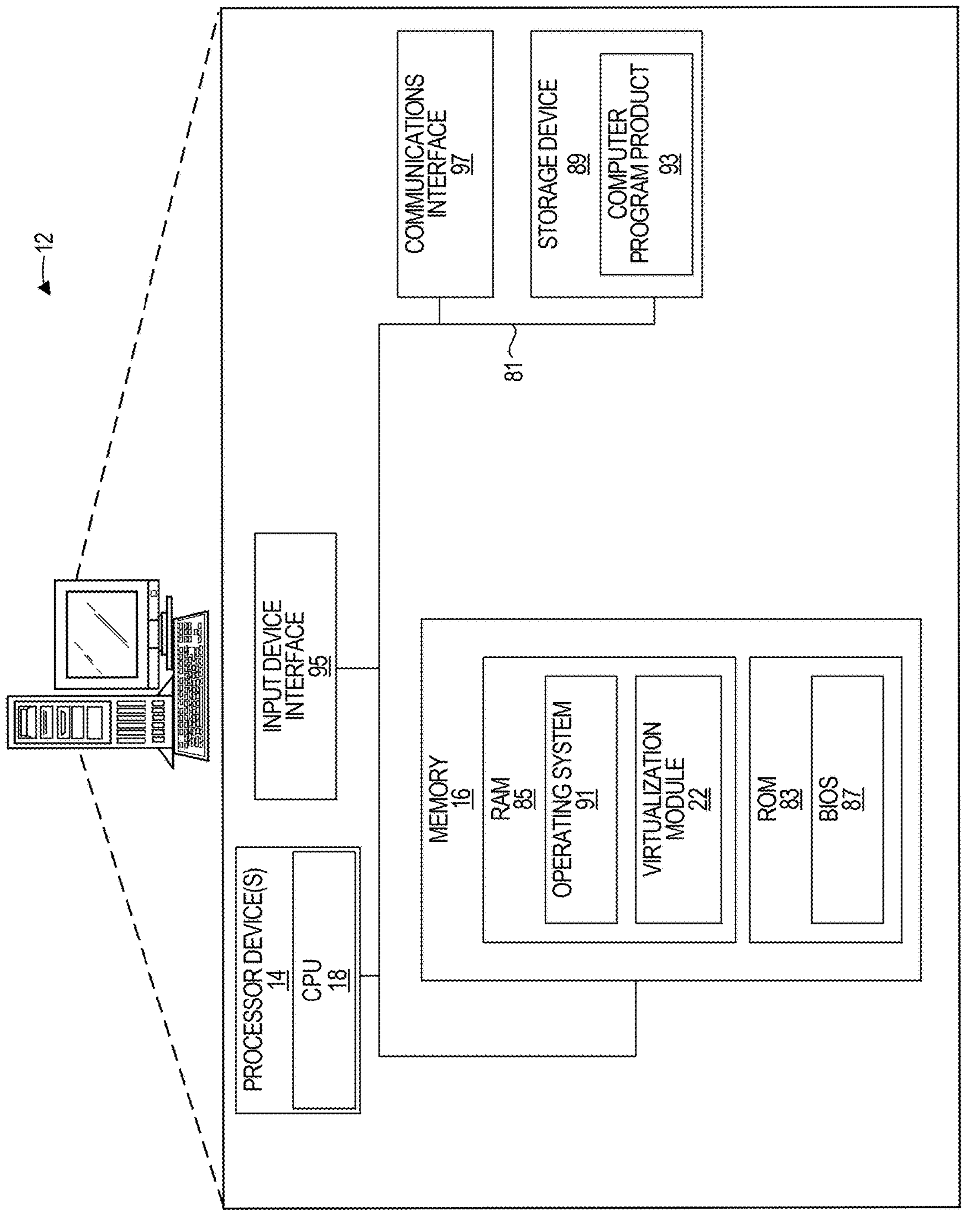
FIG. 5 is a block diagram of the computing system suitable for implementing examples according to one example.

FIG. 5 is a block diagram of the computing system 12 suitable for implementing examples according to one example. The computing system 12 may comprise any computing or electronic device capable of including firmware, hardware, and/or executing software instructions to implement the functionality described herein, such as a computer server, a desktop computing device, a laptop computing device, a smartphone, a computing tablet, or the like. The computing system 12 includes the processor device(s) 14, the memory 16, and a system bus 81. The system bus 81 provides an interface for system components including, but not limited to, the memory 16 and the processor device(s) 14. The processor device(s) 14 can be any commercially available or proprietary processor. The processor device(s) 14 can include the CPU 18.

The system bus 81 may be any of several types of bus structures that may further interconnect to a memory bus (with or without a memory controller), a peripheral bus, and/or a local bus using any of a variety of commercially available bus architectures. The memory 16 may include non-volatile memory 83 (e.g., read-only memory (ROM), erasable programmable read-only memory (EPROM), electrically erasable programmable read-only memory (EEPROM), etc.), and volatile memory 85 (e.g., random-access memory (RAM)). A basic input/output system (BIOS) 87 may be stored in the non-volatile memory 83 and can include the basic routines that help to transfer information between elements within the computing system 12. The volatile memory 85 may also include a high-speed RAM, such as static RAM, for caching data.

The computing system 12 may further include or be coupled to a non-transitory computer-readable storage medium such as the storage device 89, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 89 and other drives associated with computer-readable media and computer-usable media may provide non-volatile storage of data, data structures, computer-executable instructions, and the like.

A number of modules can be stored in the storage device 89 and in the volatile memory 85, including an operating system 91 and one or more program modules, such as the virtualization module 22, which may implement the functionality described herein in whole or in part. All or a portion of the examples may be implemented as a computer program product 93 stored on a transitory or non-transitory computer-usable or computer-readable storage medium, such as the storage device 89, which includes complex programming instructions, such as complex computer-readable program code, to cause the processor device(s) 14 to carry out the steps described herein. Thus, the computer-readable program code can comprise software instructions for implementing the functionality of the examples described herein when executed on the processor device(s) 14. The processor device(s) 14, in conjunction with the virtualization module 22 in the volatile memory 85, may serve as a controller, or control system, for the computing system 12 that is to implement the functionality described herein.

Because the virtualization module 22 is a component of the computing system 12, functionality implemented by the virtualization module 22 may be attributed to the computing system 12 generally. Moreover, in examples where the virtualization module 22 comprises software instructions that program the processor device(s) 14 to carry out functionality discussed herein, functionality implemented by the virtualization module 22 may be attributed herein to the processor device(s) 14.

An operator, such as a user, may also be able to enter one or more configuration commands through a keyboard (not illustrated), a pointing device such as a mouse (not illustrated), or a touch-sensitive surface such as a display device. Such input devices may be connected to the processor device(s) 14 through an input device interface 95 that is coupled to the system bus 81 but can be connected by other interfaces such as a parallel port, an Institute of Electrical and Electronic Engineers (IEEE) 1394 serial port, a Universal Serial Bus (USB) port, an IR interface, and the like. The computing system 12 may also include the communications interface 97 suitable for communicating with the network as appropriate or desired. The computing system 12 may also include a video port configured to interface with a display device, to provide information to the user.

Individuals will recognize improvements and modifications to the preferred examples of the disclosure. All such improvements and modifications are considered within the scope of the concepts disclosed herein and the claims that follow.

What is claimed is:

1. A method, comprising:

detecting, by a computing system comprising one or more processor devices, an execution measurement event associated with a Virtual Machine (VM) managed by a hypervisor, wherein the VM is implemented using a first processor device of the one or more processor devices;

responsive to detecting the execution measurement event, measuring, by the computing system using the first processor device of the one or more processor devices, execution measurement information descriptive of a period of execution for the VM prior to detection of the execution measurement event; and generating, by the computing system, a cryptographic signature for the execution measurement information using the first processor device of the one or more processor devices, wherein the cryptographic signature verifies that the execution measurement information was measured using the first processor device.

2. The method of claim 1, wherein the cryptographic signature is derived from a key value accessed by the first processor device.

3. The method of claim 2, wherein the key value accessed by the first processor device comprises a key value embedded in a firmware of the first processor device.

4. The method of claim 3, wherein the first processor device comprises a virtualized processor device.

5. The method of claim 2, wherein the key value accessed by the first processor device comprises a key value embedded in a hardware of the first processor device.

6. The method of claim 2, wherein the method further comprises:

computing, by the computing system, a malicious activity detection output indicative of whether the period of execution for the VM comprises malicious activity.

7. The method of claim 6, wherein computing the malicious activity detection output comprises:

validating, by the computing system, the cryptographic signature based on a second key value paired to the key value accessed by the first processor device.

8. The method of claim 7, wherein computing the malicious activity detection output further comprises:

comparing, by the computing system, an expected period of execution to the period of execution for the VM prior to the detection of the execution measurement event.

9. The method of claim 8, wherein measuring the execution measurement information using the first processor device of the one or more processor devices comprises:

measuring, by the computing system using the first processor device of the one or more processor devices, a duration of the period of execution for the VM prior to detection of the execution measurement event; and wherein comparing the expected period of execution to the period of execution for the VM prior to the detection of the execution measurement event comprises:

comparing, by the computing system, the duration of the period of execution for the VM prior to detection of the execution measurement event to an expected duration of the period of execution.

10. The method of claim 6, wherein computing the malicious activity detection output indicative of whether the period of execution for the VM comprises malicious activity comprises:

computing, by the computing system, the malicious activity detection output, wherein the malicious activity detection output indicates that the period of execution for the VM comprises malicious activity.

11. The method of claim 10, wherein the malicious activity detection output identifies the malicious activity as an unauthorized VM exit event caused by the hypervisor.

12. The method of claim 11, wherein the method further comprises:

generating, by the computing system, a notification indicating that the hypervisor is associated with malicious activity.

13. The method of claim 1, wherein the method further comprises:

providing, by the computing system, the execution measurement information and the cryptographic signature to a computing device of an entity associated with the virtual machine; and responsive to providing the execution measurement information and the cryptographic signature, receiving, by the computing system from the computing device, validation information that validates the cryptographic signature and the period of execution for the VM prior to detection of the execution measurement event described by the execution measurement information.

14. The method of claim 1, wherein generating the cryptographic signature for the execution measurement information using the first processor device of the one or more processor devices, wherein the cryptographic signature verifies that the execution measurement information was measured using the first processor device comprises:

obtaining, by the computing system, information from a runtime register of the first processor device of the one or more processor devices; and generating, by the computing system, the cryptographic signature based on the information from the runtime register.

15. The method of claim 14, wherein generating the cryptographic signature based on the information from the runtime register comprises:

generating, by the computing system, the cryptographic signature based on the information from the runtime register and a previous cryptographic signature generated prior to the cryptographic signature.

16. The method of claim 1, wherein detecting the execution measurement event associated with the VM managed by the hypervisor comprises:

detecting, by the computing system, a VM exit event associated with the VM.

17. The method of claim 1, wherein detecting the execution measurement event associated with the VM managed by the hypervisor comprises:

detecting, by the computing system, that a predetermined amount of time has passed since execution of the VM was last measured.

18. A computing system comprising:

one or more processor devices to:

detect an execution measurement event associated with a Virtual Machine (VM) managed by a hypervisor, wherein the VM is implemented using a first processor device of the one or more processor devices;

responsive to detecting the execution measurement event, measure, using the first processor device of the one or more processor devices, execution measurement information descriptive of a period of execution for the VM prior to detection of the execution measurement event; and generate a cryptographic signature for the execution measurement information using the first processor device of the one or more processor devices, wherein the cryptographic signature verifies that the execution measurement information was measured using the first processor device.

19. The computing system of claim 18, wherein the cryptographic signature is derived from a key value accessed by the first processor device.

20. A non-transitory computer-readable storage medium that includes executable instructions to cause one or more processor devices to:

detect an execution measurement event associated with a Virtual Machine (VM) managed by a hypervisor, wherein the VM is implemented using a first processor device of the one or more processor devices;

responsive to detecting the execution measurement event, measure, using the first processor device of the one or more processor devices, execution measurement information descriptive of a period of execution for the VM prior to detection of the execution measurement event; and generate a cryptographic signature for the execution measurement information using the first processor device of the one or more processor devices, wherein the cryptographic signature verifies that the execution measurement information was measured using the first processor device.

* * * * *